United States Patent [19]
Wright et al.

[11] Patent Number: 5,763,117
[45] Date of Patent: Jun. 9, 1998

[54] ELECTROCHEMICAL CELL

[75] Inventors: Michael L. Wright, Allestree, England; Anthony A. Meintjes, Lynnwood Glen, South Africa

[73] Assignee: Electro Chemical Holdings Societe Anonyme, Luxembourg, Luxembourg

[21] Appl. No.: 672,358

[22] Filed: Jun. 25, 1996

[30] Foreign Application Priority Data

Jun. 26, 1995 [GB] United Kingdom .................. 9512971

[51] Int. Cl.$^6$ .......................... H01M 2/10; H01M 10/39
[52] U.S. Cl. ......................................... 429/104; 429/186
[58] Field of Search ...................... 429/103, 104, 429/186

[56] References Cited

U.S. PATENT DOCUMENTS

| | | | |
|---|---|---|---|
| 3,488,221 | 1/1970 | Shimotake et al. | 136/20 |
| 3,514,332 | 5/1970 | Minck | 136/6 |
| 3,716,409 | 2/1973 | Cairns et al. | 136/6 |
| 3,783,024 | 1/1974 | Gibson et al. | 136/6 |
| 3,841,914 | 10/1974 | Boyle et al. | 136/111 |
| 3,901,733 | 8/1975 | Toy et al. | 136/153 |
| 3,932,195 | 1/1976 | Evans et al. | 136/6 FS |

(List continued on next page.)

FOREIGN PATENT DOCUMENTS

| | | |
|---|---|---|
| 0 001 351 | 4/1979 | European Pat. Off. . |
| 0 064 234 | 4/1982 | European Pat. Off. . |
| 0 390 185 A2 | 10/1990 | European Pat. Off. . |
| 0 399 786 A2 | 11/1990 | European Pat. Off. . |
| 2.135.125 | 2/1972 | France . |
| 3338955 A1 | 5/1985 | Germany . |
| 3718918 | 12/1987 | Germany . |

OTHER PUBLICATIONS

Bittihn et al., "The SWING system, a nonaqueous rechargeable carbon/metal oxide cell," *Journal of Power Sources*, pp., 223–231, 1993. (month unknown).

Mikkor, "Volume Optimization of Sodium–Sulfur Batteries Using Various Advanced Cell Concepts," *The American Institute of Aeronautics and Astronautics*, vol. 1 of 3, Proceedings of the 15th Intersociety Energy Conversion Engineering Conference, Energy to the 21st Century, Seattle, Washington, Aug. 1980.

(List continued on next page.)

*Primary Examiner*—Stephen Kalafut
*Attorney, Agent, or Firm*—Arnold, White & Durkee

[57] ABSTRACT

A high temperature rechargeable electrochemical cell comprises a housing in the form of a canister which is polygonal in cross-section so that it has a plurality of peripherally spaced corners. A solid electrolyte separator which is a conductor of sodium ions, separates the interior of the housing into an anode compartment containing an anode and a cathode compartment containing a cathode. The separator is tubular or cup-shaped, having a closed end and an open end, and having a plurality of peripherally spaced radially outwardly projecting ribs or lobes corresponding in number to the corners of the housing. The separator is concentrically located in the housing, with each lobe of the separator being peripherally aligned with, and projecting towards, one of said corners of the housing. Anchoring components anchoring the separator in position relative to the housing, are provided. The anchoring component comprises a first portion spanning a gap between the housing and the separator, between a pair of lobes of the separator, and a second portion protruding from the first portion and engaging a surface of a lobe of the separator. Sodium is provided as active anode material in the anode compartment, with the cell having an operating temperature at which the sodium is molten, while active cathode material is provided in the cathode compartment.

16 Claims, 2 Drawing Sheets

U.S. PATENT DOCUMENTS

| | | | |
|---|---|---|---|
| 3,985,575 | 10/1976 | Ludwig | 429/103 |
| 4,041,215 | 8/1977 | Kormanyos et al. | 429/104 |
| 4,049,885 | 9/1977 | Mitoff | 429/104 |
| 4,068,045 | 1/1978 | Abrams | 429/81 |
| 4,091,151 | 5/1978 | Minck | 429/104 |
| 4,206,272 | 6/1980 | Fischer et al. | 429/62 |
| 4,220,692 | 9/1980 | Hunt | 429/104 |
| 4,226,923 | 10/1980 | Mikkor | 429/104 |
| 4,230,778 | 10/1980 | von Benda et al. | 429/104 |
| 4,269,905 | 5/1981 | Wedlake | 429/8 |
| 4,279,974 | 7/1981 | Nishio | 429/104 |
| 4,310,607 | 1/1982 | Shay | 429/104 |
| 4,348,467 | 9/1982 | Wright | 429/94 |
| 4,366,215 | 12/1982 | Coetzer et al. | 429/199 |
| 4,405,696 | 9/1983 | Fischer et al. | 429/104 |
| 4,414,299 | 11/1983 | Ansell | 429/104 |
| 4,419,419 | 12/1983 | Knödler | 429/104 |
| 4,424,262 | 1/1984 | von Alpen et al. | 429/8 |
| 4,476,201 | 10/1984 | Repenning et al. | 429/62 |
| 4,492,742 | 1/1985 | Haberfellner et al. | 429/104 |
| 4,497,879 | 2/1985 | Lücke et al. | 429/62 |
| 4,529,676 | 7/1985 | Galloway et al. | 429/103 |
| 4,546,055 | 10/1985 | Coetzer et al. | 429/103 |
| 4,560,627 | 12/1985 | Bones et al. | 429/103 |
| 4,568,502 | 2/1986 | Theodore et al. | 264/63 |
| 4,588,662 | 5/1986 | McManis, III et al. | 429/52 |
| 4,592,969 | 6/1986 | Coetzer et al. | 429/50 |
| 4,626,483 | 12/1986 | Bones et al. | 429/50 |
| 4,683,179 | 7/1987 | Langpape et al. | 429/104 |
| 4,722,875 | 2/1988 | Wright | 429/103 |
| 4,728,590 | 3/1988 | Redey | 429/221 |
| 4,732,741 | 3/1988 | Duncan et al. | 423/119 |
| 4,772,449 | 9/1988 | Bones et al. | 419/2 |
| 4,797,333 | 1/1989 | Coetzer et al. | 429/103 |
| 4,800,143 | 1/1989 | Harbach et al. | 429/153 |
| 4,846,943 | 7/1989 | Coetzer et al. | 204/61 |
| 4,894,299 | 1/1990 | Morse | 429/104 |
| 4,910,105 | 3/1990 | Tilley et al. | 429/103 |
| 4,925,749 | 5/1990 | Wright | 429/104 |
| 4,973,534 | 11/1990 | Adendorff et al. | 429/103 |
| 4,975,343 | 12/1990 | Coetzer | 429/103 |
| 4,975,344 | 12/1990 | Wedlake et al. | 429/103 |
| 4,992,345 | 2/1991 | Meintjes et al. | 429/103 |
| 5,006,427 | 4/1991 | Böhm et al. | 429/101 |
| 5,019,466 | 5/1991 | Coetzer et al. | 429/103 |
| 5,051,324 | 9/1991 | Bones et al. | 429/193 |
| 5,053,294 | 10/1991 | Sernka et al. | 429/104 |
| 5,059,497 | 10/1991 | Prince et al. | 429/193 |
| 5,061,580 | 10/1991 | Wedlake et al. | 429/103 |
| 5,143,802 | 9/1992 | Wright | 429/103 |
| 5,158,839 | 10/1992 | Wright | 429/103 |
| 5,187,029 | 2/1993 | Coetzer et al. | 429/102 |
| 5,196,279 | 3/1993 | Tarascon | 429/194 |
| 5,208,119 | 5/1993 | Duncan | 429/104 |
| 5,219,682 | 6/1993 | Bones et al. | 429/193 |
| 5,230,968 | 7/1993 | Bones et al. | 429/191 |
| 5,234,778 | 8/1993 | Wright | 429/103 |
| 5,279,908 | 1/1994 | Bones et al. | 429/102 |
| 5,283,135 | 2/1994 | Redey et al. | 429/103 |
| 5,316,877 | 5/1994 | Thackeray et al. | 429/197 |
| 5,340,668 | 8/1994 | Redey et al. | 429/103 |
| 5,403,676 | 4/1995 | Coetzer et al. | 429/50 |
| 5,441,829 | 8/1995 | Attwood et al. | 429/158 |
| 5,472,806 | 12/1995 | Meintjes | 429/165 |
| 5,476,732 | 12/1995 | Coetzer | 429/103 |
| 5,476,733 | 12/1995 | Coetzer et al. | 429/103 |

FOREIGN PATENT DOCUMENTS

| | | |
|---|---|---|
| 1050694 | 12/1966 | United Kingdom. |
| 1 344 069 | 1/1974 | United Kingdom. |
| 1 421 702 | 1/1976 | United Kingdom. |
| 2 018 013 | 10/1979 | United Kingdom. |
| 1 586 659 | 3/1981 | United Kingdom. |
| 2 064 206 | 6/1981 | United Kingdom. |
| 2 082 379 | 3/1982 | United Kingdom. |
| 2 114 114 | 8/1983 | United Kingdom. |
| 2 122 412 | 1/1984 | United Kingdom. |
| 2 164 786 | 3/1986 | United Kingdom. |
| 2 159 661 | 12/1986 | United Kingdom. |
| 2 191 332 | 12/1987 | United Kingdom. |
| 2 191 333 | 12/1987 | United Kingdom. |
| 2 192 305 | 1/1988 | United Kingdom. |
| 2 210 612 | 6/1989 | United Kingdom. |
| 2 213 310 | 8/1989 | United Kingdom. |
| 2 221 213 | 1/1990 | United Kingdom. |
| 2 225 667 | 6/1990 | United Kingdom. |
| 2 226 181 | 6/1990 | United Kingdom. |
| 2 226 442 | 6/1990 | United Kingdom. |
| 2 226 692 | 7/1990 | United Kingdom. |
| 2 227 357 | 7/1990 | United Kingdom. |
| 2 231 567 | 11/1990 | United Kingdom. |
| 2 234 233 | 1/1991 | United Kingdom. |
| 2 240 424 | 7/1991 | United Kingdom. |
| 2 242 306 | 9/1991 | United Kingdom. |
| 2 242 898 | 10/1991 | United Kingdom. |
| 2 244 701 | 12/1991 | United Kingdom. |
| 2 245 264 | 1/1992 | United Kingdom. |
| 2 246 904 | 2/1992 | United Kingdom. |
| 2 251 119 | 6/1992 | United Kingdom. |
| 2 257 426 | 1/1993 | United Kingdom. |
| 2 270 195 | 3/1994 | United Kingdom. |
| 2 276 759 | 10/1994 | United Kingdom. |
| 2 280 779 | 2/1995 | United Kingdom. |
| 2 281 436 | 3/1995 | United Kingdom. |
| 2 285 535 | 7/1995 | United Kingdom. |
| 2 290 163 | 12/1995 | United Kingdom. |
| WO 93/07650 | 4/1993 | WIPO. |

OTHER PUBLICATIONS

Neuman, Tony, South African Patent Application No. 94/0054 entitled "Electrochemical Cell", dated Jan. 5, 1994.

Pett et al., "Plate–Type Beta Alumina Electrolytes for an Advanced Sodium–Sulfur Cell Design", *Am. Ceramic Bulletin*, 64(4):589–592, 1985. (month unknown).

Seo et al., "Investigation of High Temperature Battery Systems", Technical Report prepared for Army Electronics Command, Distributed by National Technical Information Service: U.S. Dept. of Commerce, Jan. 1974.

Tarascon et al., "The Spinel Phase of $LiMn_2O_4$ as a Cathode in Secondary Lithium Cells," *J. Electrochem. Soc.*, 138(10):2859–2864, Oct., 1991.

International Search Report dated Nov. 20, 1995.

ELECTROCHEMICAL CELL

This invention relates to an electrochemical cell. More particularly, it relates to a high temperature rechargeable electrochemical cell.

According to the invention, there is provided a high temperature rechargeable electrochemical cell, comprising:

a housing in the form of a canister which is polygonal in cross-section so that it has a plurality of peripherally spaced corners;

a solid electrolyte separator which is a conductor of sodium ions, separating the interior of the housing into an anode compartment containing an anode and a cathode compartment containing a cathode, the separator being tubular or cup-shaped, having a closed end and an open end, and having a plurality of peripherally spaced radially outwardly projecting ribs or lobes corresponding in number to the corners of the housing, and the separator being concentrically located in the housing, with each lobe of the separator being peripherally aligned with, and projecting towards, one of said corners of the housing;

at least one anchoring component anchoring the separator in position relative to the housing, the anchoring component comprising a first portion spanning a gap between the housing and the separator, between a pair of lobes of the separator, and a second portion protruding from the first portion and engaging a surface of a lobe of the separator;

sodium as active anode material in the anode compartment, with the cell having an operating temperature at which the sodium is molten; and active cathode material in the cathode compartment.

As many anchoring components or shims as there are separator lobes, may be provided, the first portion of each anchoring component being located between a pair of the lobes and the second portion of each engaging a different lobe of the separator. The second portion of one anchoring component may overlay the first portion of the anchoring component adjacent it.

The anchoring components may extend the full length of the separator. The first and second portions of the anchoring components may be such that the second portions of the anchoring components are biased into contact with the first portions of the adjacent anchoring components where said second portions overlap said first portions.

Each anchoring component may be formed, eg rolled, from a metal sheet. Thus, the first portion may comprise a coil of the metal sheet extending substantially the full length of the separator, while the second component may comprise a flap of the sheet protruding from the coil. The coil may comprise at least one full winding of the sheet, while the flap may be arcuate shaped to accommodate the outer surface of the separator lobe. The sheet may thus be shaped or rolled so that, in non-assembled configuration, the flap is unbiased; however, when assembled in the cell as hereinbefore described, the flap is biased into contact with the coil of the adjacent anchoring component.

The metal of the anchoring component will be selected such that it is chemically and electrochemically inert in the anode environment while being electrically conductive. The anchoring components can hence be formed from steel or nickel sheets or foil.

The cell can thus be of a type wherein the cathode compartment contains, at the cell operating temperature and when the cell is in a charged state, a sodium aluminium halide molten salt electrolyte, which is also molten at the operating temperature of the cell, and has the formula $NaAlHal_4$ where Hal is a halide; and a cathode comprising an electronically conductible electrolyte-permeable porous matrix which has dispersed therein the active cathode material or substance, with the matrix being impregnated with the molten electrolyte. The active cathode substance or material may then have the formula $THal_2$ where Hal is the halide of the electrolyte and T is a transition metal selected from the group of transition metals consisting of Fe, Ni, Co, Cr, Mn and mixtures thereof. More specifically, the cell may be of a type wherein; the separator is nasicon, β-alumina or β"-alumina which are known as conductors of sodium ions; and Hal is chlorine, so that the electrolyte is $NaAlCl_4$, the cell thus having as its cell reaction:

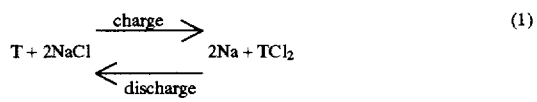

$$T + 2NaCl \underset{\text{discharge}}{\overset{\text{charge}}{\rightleftarrows}} 2Na + TCl_2 \quad (1)$$

wherein T is Ni, Fe or mixtures thereof.

Initially, the cell may contain some sodium in the anode compartment. However, in one embodiment of the invention, no sodium may initially be present in the anode compartment. However, some aluminium and/or zinc will then initially be loaded into the cathode compartment, to form a cell precursor or a cell in overdischarged state. On subjecting the cell precursor to an initial charging, the aluminium and/or zinc will then react with NaCl in the cathode compartment to produce further molten salt electrolyte $NaAlCl_4$ and to form sodium which then passes through the separator into the anode compartment. Sufficient aluminium and/or zinc will then be provided so that the initial reaction with the aluminium and/or zinc on charging provides the initial upstarting amount of sodium in the anode compartment, as described in published British Patent Application No. 2191332A which is hence incorporated herein by reference.

Published British Patent Application No. 2191332A also describes other features and refinements of the cell according to the invention, such as the proportion of alkali metal ions and aluminium ions in the electrolyte having to be such that the solubility of the active cathode substance in the molten electrolyte is at or near its minimum, the use of $Co/CoCl_2$ or $Ni/NiCl_2$ as a cathode substance in parallel with a $Fe/FeCl_2$ cathode, to protect the $Fe/FeCl_2$ from overcharging, in cases where the cell of the present invention has an $Fe/FeCl_2$ cathode; the use of fluoride anions as a dopant in the $NaAlCl_4$ electrolyte to resist progressive internal resistance rise associated with sustained cycling and believed to arise from poisoning of β-alumina separators by $AlCl_3$ in the electrolyte; the use of chalcogens such as S or Se dopants in the liquid electrolyte and/or active cathode substance to resist progressive reduction in cathode capacity with sustained cycling in $Ni/NiCl_2$ cathodes, etc.

A layer of sodium wettable particles may be provided on the separator surface which is in contact with the anchoring components. Such particles promote contact of the sodium in the anode compartment with the separator by ensuring efficient transport of sodium and electrons to and from the separator surface. The anchoring components then augment the wicking capability of the particles.

The sodium wettable particles may be electrochemically conducting so that they need not be primed with sodium. The diameters of the particles should also be as small as possible since this enhances their wicking capability.

The particles may be fixed to the separator. The particles may thus be embedded in a glass layer bonded to the separator. The glass layer may be composed of a water soluble glass, as sodium silicate, sodium polyphosphate, boric acid or the like. Sodium polyphosphate is, however, preferred in view of its high degree of water solubility which enhances its bonding to the separator, and its relatively low dehydration temperature, which promotes the formation of a uniform and even layer or coat of the glass on the separator.

The particles can hence be fixed to the separator surface by dissolving the water soluble glass in water, admixing the particles with the glass/water solution so that the particles are suspended therein, coating the separator with the resistant composition, and drying the coat to form the glass layer or coat on the separator surface. The proportion of particles to glass is not critical, provided that there is sufficient glass to give adequate adhesion to the separator, and sufficient particles to give adequate conductivity. The coating of the separator with the composition can be effected by any suitable means, eg applying it by brush to the separator.

The particles may be metal or carbon particles, but carbon particles are preferred in view of their mass and coat advantage over metal particles. The particulate carbon may be in the form of carbon powder, such as graphite powder or 'lamp black', which is a form of carbon black. Both these carbon powders have the desired degrees of fineness for smooth application to the separator and adherence thereto. Lamp black is, however, preferred in view of its ease of application, good adherence properties and smooth coat finish. Carbon blacks generally have particle sizes in the nonometer range, and it is felt that a lamp black having an average particle size of 50 nonometers, will have good wicking ability when wetted with sodium.

The housing may have a base for supporting the cell in an upright operative attitude on a flat upwardly horizontal support surface with the closed end of the separator lowermost. The corners of the housing, and hence the ribs of the separator, may be spaced equidistantly apart peripherally or circumferentially. Thus, the housing may be regular-polygonal, eg a square or hexagonal metal canister, in cross-section, the cross-section permitting the cell to be close-packed in side-by-side relationship with a plurality of identical cells, in which case the number of lobes may respectively be four or six, as the case may be, being regularly circumferentially spaced.

Preferably, the cell has both a cathode in the form of a matrix as described above and a housing of polygonal cross-section as described above. In a particular embodiment of the invention, the cross-section of the housing is preferably rectangular, eg square, with the separator being cruciform in horizontal cross-section, and having four said lobes. The entire volumes of the anode and of the cathode may be contained respectively in the associated electrode compartments, so that there is no external reservoir of electrode material, the capacity of the anode in the anode compartment being matched with that of the cathode in the cathode compartment. In other words, all the active anode material may be contained in the anode compartment, inside the housing, all the active cathode material being contained in the cathode compartment, inside the housing, and the volume ratio of the cathode compartment:anode compartment being 1.8:1–2.2:1. The separator may be in the form of a sintered unitary polycrystalline ceramic artifact formed from a solid electrolyte selected from sodium β-alumina, sodium β"-alumina and nasicon.

The cathode may be located outside the separator, between the separator and the housing and surrounding the separator, with the anode located inside the interior of the separator. The separator may then have an anode current collector, eg in the form of a metal post such as a steel or nickel post, projecting downwardly into its interior from its open upper end, to a position adjacent and spaced closely from its closed lower end. Instead, the anode may be located outside the separator, between the separator and the housing and surrounding the separator, with the cathode inside the separator and having a similar metal post current collector from which optional extensions may extend into each lobe to improve current collection. It will be appreciated that the interior of the housing is divided by said separator into the anode compartment and the cathode compartment, one of which is in the interior of the separator and the other of which is between the separator and the housing. Whether the anode is inside the separator with the cathode outside the separator, or vice versa, the volume ratio of cathode compartment:anode compartment may, as indicated above, be 1.8:1–2.2:1, preferably 2:1.

The separator may be in the form of a sintered pressing, being made in a fashion similar to conventional separator tubes of circular cross-section, by pressing a layer of powder on to a mandrel, eg by isostatic pressing, the powder being of a solid electrolyte or a precursor thereof which is converted to solid electrolyte by sintering, the mandrel being removed after the pressing to leave a green separator, and the green separator being sintered to provide the separator in the form of a sintered polycrystalline ceramic artifact. The separator may, as indicated above, be of β-alumina, nasicon or, preferably, β"-alumina.

The invention will now be described by way of example with reference to the accompanying diagrammatic drawings.

Figure 1:
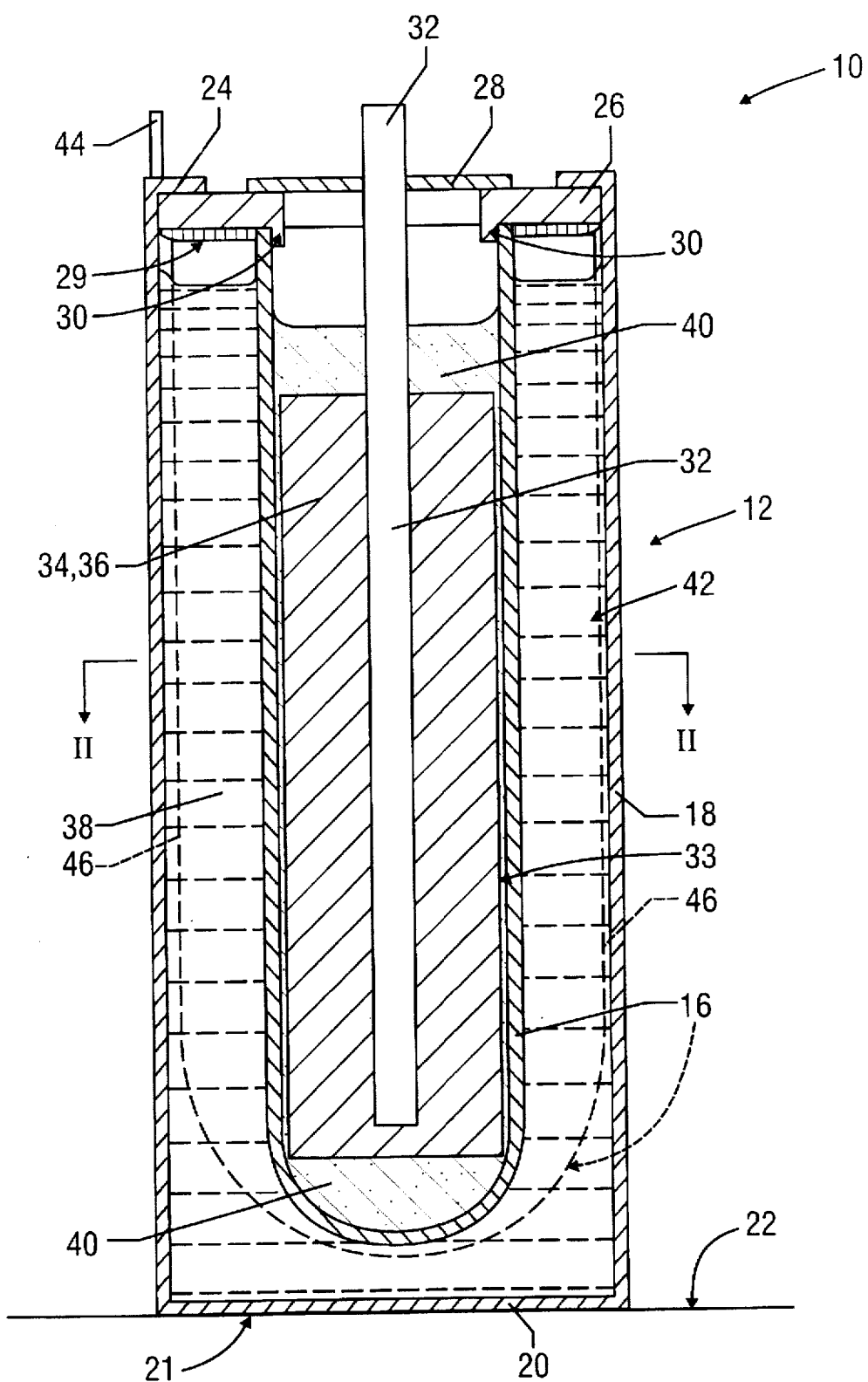
FIG. 1 shows a schematic sectional side elevation of a cell according to the invention, taken in the direction of line I—I in FIG. 2, and shown without the anchoring components.
Figure 3:
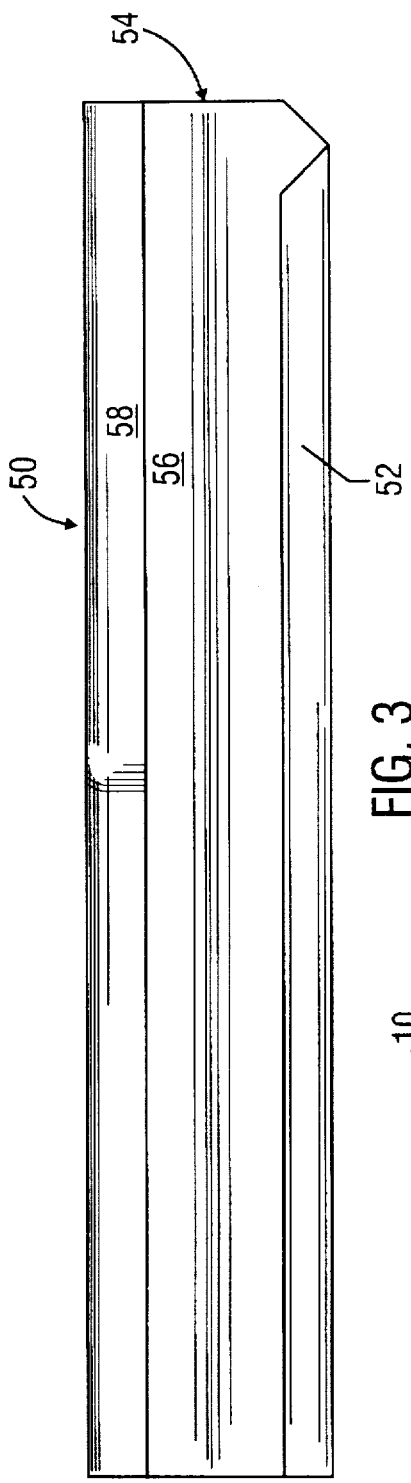
FIG. 3 shows a front view of one of the anchoring components of FIG. 2.

In the drawings, reference numeral 10 generally designates a rechargeable high temperature electrochemical power storage cell in accordance with the present invention. The cell 10 comprises a mild steel housing in the form of a canister 12 which is elongated in a vertical direction and is substantially square in cross-section, having rounded corners at 14. The cell 10 has a tubular, roughly cup-shaped β-alumina separator 16 located concentrically in the interior of the housing 12, the separator having a closed lower end and an open upper end, and being described in more detail hereunder.

The canister 12 has side walls 18 and a lower end provided with a square floor panel 20 welded to the lower edges of the walls 18, which panel 20 provides, with the lower edges of the walls 18, a base 21 for supporting the cell in an upright condition on a flat horizontal upwardly facing support surface 22 as shown in FIG. 1. The closed lower end of the separator 16 is spaced above said floor panel 20. The upper end of the canister 12 is closed off by a square upper closure in the form of a mild steel closure panel 24, welded to the upper edges of the walls 18. The closure panel 24 has a central opening therein, sealed off by electronically insulating material in the form of an α-alumina insulating ring 26 of more or less square plan view outline, the ring 24 having a flat upper surface thermocompression bonded to the lower surface of the panel 24, at the periphery of the central opening in the panel 24. The ring 26 has a central opening therethrough, closed off by a mild steel closure disc 28 thermocomprsession bonded to its flat upper surface and spaced radially inwardly by an insulating space from the panel 24. The open upper end of the separator 16 is glass-welded at 29 into a rebate 30 provided therefor in the periphery of the lower surface of the ring 26, which lower surface is flat. A nickel current collector post 32 projects inwardly from the exterior of the housing 12, through the closure disc 28, the post having an upper end, projecting upwardly above the disc 28, which provides a cell cathode terminal 32. The lower end of the post, which extends along the axis of the cell 10, is spaced above the closed lower end of the separator 16, in its interior.

The interior of the separator 16 provides a cathode compartment 33 which contains a cathode 34 which comprises a porous iron matrix 36 having a porous, liquid-permeable interior, the pores of which are saturated with $NaAlCl_4$, comprising a substantially equimolar mixture of NaCl and $AlCl_3$ and which is molten at the cell operating temperature. The space between the separator 16 and the housing 12 provides an anode compartment 42 containing an anode 38 of sodium, which is similarly molten at the operating temperature of the cell. NaCl in finely divided form is dispersed in the porous interior of the matrix 36 in all states of charge of the cell, and the matrix 36 is immersed in the molten salt $NaAlCl_4$ electrolyte, shown at 40, which electrolyte is doped with doping amounts of FeS and NaF, and is known in the art. The post 32 is, in the interior of the separator 16, embedded in the matrix 36. The canister 12, which forms an anode current collector, is provided with an anode terminal 44.

The separator 16 is cruciform in cross-section, is in plan view outline, having four lobes 46 which are regularly circumferentially spaced by 90° C. from each other and respectively project into the corners 14 of the canister 12, from which they are closely spaced. Each lobe 46 contains a lobe of the matrix 36 of the cathode 34, as described in GB 9415583.5 which is hence incorporated herein by reference.

Figure 4:
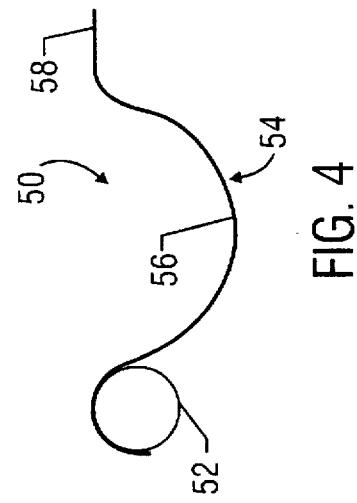
FIG. 4 shows an end view of the anchoring component of FIG. 3.
Figure 2:
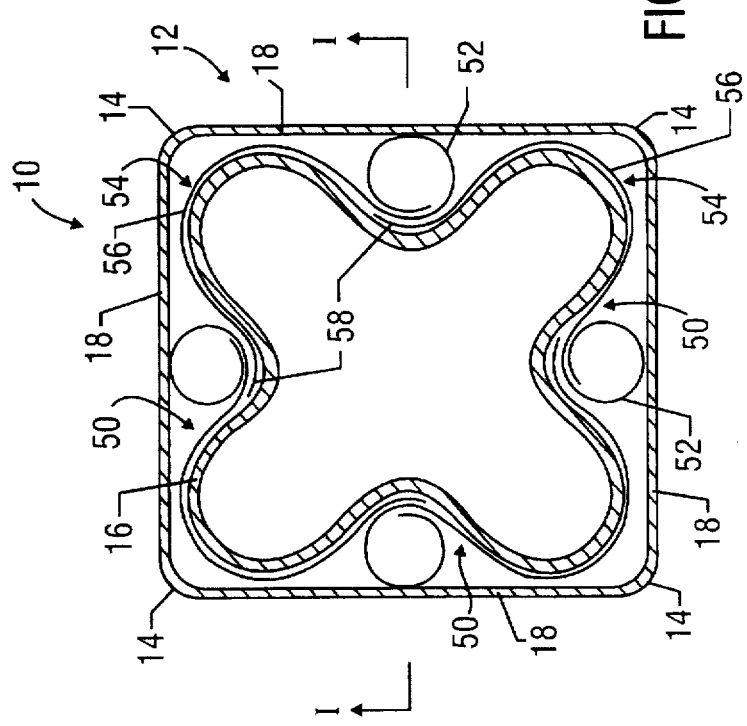
FIG. 2 shows a schematic horizontal cross-section view of the cell of FIG. 1, in the direction of line II—II in FIG. 1, with some details omitted for clarity.

The cell also includes four anchoring components or shims, each generally indicated by reference numeral 50. Each anchoring component 50 is rolled from a steel foil or sheet, which can optionally be nickel plated, so that it has a first portion 52 in the form of a coil containing one complete roll or cylinder of metal, as well as a flap or second portion 54 protruding from the coil. The flap 54 has an arcuate or convex portion 56, as well as a flange 58. In its inoperative configuration, the flap 54 is not under tension, as indicated in FIG. 4.

The coil 52 of each anchoring component 50 spans a gap between the cell casing or canister 12 and the separator between a pair of lobes 46 thereof, while its flap 54 engages and extends around a separator lobe 46 so that its flange 58 abuts against the coil 52 of an adjacent anchoring component 50. In this configuration, the flange 58 is biased into contact with the coil 52 of the adjacent anchoring component, due to the arcuate portion 56 being stressed. The anchoring components 50 are thus in electrical contact with each other.

The anchoring components 50 extend the full length of the separator 16. Each anchoring component 50 is thus in electrical contact with both the canister 12 and the separator 16.

It will be appreciated that where gaps are shown, in the drawings, between the various parts of each anchoring component 50, between overlapping parts of adjacent anchoring components and between the separator 16 and the anchoring components 50, these are for each of illustration. In practice these will naturally abut against each other for good contact.

The side of the separator 16 which is directed into the anode compartment 42, ie which is in contact with the anchoring component 50, can, if desired or necessary, be provided with a coating or layer (not shown) comprising sodium wettable particles. More particularly, the coating or layer may then be composed of lamp black particles embedded in a sodium polyphosphate glass layer adhering to the separator so that the carbon particles are hence located against or on the separator surface. The layer can be applied to the separator by dissolving 40 parts by mass sodium hexametaphosphate, available from BDH Limited, in 100 parts by mass water. A few drops of acetone to assist in wetting of the carbon black particles are added to the solution. Sufficient lamp black, is a carbon black having an average particle size of about 50 nonometers, is added to the solution until it has a consistency suitable for painting. The mass proportion of sodium hexametaphosphate to carbon black is not critical, and typically is about 1:1. Sufficient glass should be present to give adequate adhesion of the layer to the separator, while sufficient lamp black should be present to give adequate conductivity. The 'paint' is applied by brush to the separator 16, and it is then dried in air at 275° C. for two hours prior to use.

In other embodiments of the invention, however, other varieties of carbon black, which are commonly used in paints and inks, as well as other varieties of sodium polyphosphate, can be used. It is believed that the sodium polyphosphate, which is ionically conducting, assists in passage of sodium through the layer.

Initially, the layer of particles (when preset) and anchoring components 50 provide the required electrical contact between the canister 12 and the separator 16. However, on the first sodium passing through the separator it 'wicks' along the layer and forms an interface between the layer and the anchoring components 50, thereby providing further electrical contact between the canister 12 and the separator.

On charging the cell 10, the following reactions take place in the cathode compartment:

$$2NaCl+Fe \rightarrow 2Na+FeCl_2 \ldots \quad (2)$$

The Na generated by reaction (2) passes through the beta-alumina into the anode compartment 42.

The Applicant believes that the use of the anchoring components 50 will give good results since they serve to anchor the separator firmly into position utilizing only four anchoring components, while providing good wicking of the sodium against the outer separator surface and permitting movement of sodium within the anode compartment 42. Furthermore, the anchoring components are easy to install. Still further, the anchoring components 50, while holding the separator firmly, provide some flexibility. Thus, they can move with respect to each other where their second portions or flaps 54 overlap the first portions or coils 52 of the adjacent anchoring components, thereby to accommodate slightly different shapes and tolerances in the separator 16. They also anchor the separator 16 against vibration, and will serve to prevent rapid mixing of the electrolyte and the sodium in the event of the separator 16 cracking. The anchoring components 50 also act as anode compartment current collectors. The anchoring components also ensure that the anode compartment functions efficiently from a sodium wetting point of view. Thus, only a small quantity of sodium is retained in the anode compartment at full discharge, while still ensuring good electrical contact and wettability of the separator surface with alkali metal, at full discharge.

We claim:

1. A high temperature rechargeable electrochemical cell, comprising:

a housing in the form of a canister which is polygonal in cross-section so that it has a plurality of peripherally spaced corners;

a solid electrolyte separator which is a conductor of sodium ions, separating the interior of the housing into an anode compartment containing an anode and a cathode compartment containing a cathode, the separator being tubular or cup-shaped, having a closed end and an open end, and having a plurality of peripherally spaced radially outwardly projecting ribs or lobes corresponding in number to the corners of the housing, and the separator being concentrically located in the housing, with each lobe of the separator being peripherally aligned with, and projecting towards, one of said corners of the housing;

anchoring components anchoring the separator in position relative to the housing, with as many anchoring components as there are separator lobes being provided, each anchoring component comprising a first portion spanning a gap between the housing and the separator, between a pair of lobes of the separator, and a second portion protruding from the first portion, the second portion extending around a lobe of the separator and engaging a surface of the lobe, with the first portions of the anchoring components being located between different pairs of the lobes, and the second portions thereof engaging different lobes of the separator;

sodium as active anode material in the anode compartment, with the cell having an operating temperature at which the sodium is molten; and active cathode material in the cathode compartment.

2. An electrochemical cell according to claim 1, wherein the second portion of one anchoring component overlaps the first portion of the anchoring component adjacent it.

3. An electrochemical cell according to claim 2, wherein the anchoring components extend the full length of the separator, with the first and second portions of the anchoring components being such that the second portions of the anchoring components are biased into contact with the first portions of the adjacent anchoring components where said second portions overlap said first portions.

4. An electrochemical cell according to claim 1, wherein each anchoring component is formed from a metal sheet, with the first portion comprising a coil of the metal sheet extending substantially the full length of the separator, while the second component comprises a flap of the sheet protruding from the coil.

5. An electrochemical cell according to claim 4, wherein the coil comprises at least one full winding of the sheet, while the flap is arcuate shaped to accommodate the outer surface of the lobe.

6. An electrochemical cell according to claim 1, wherein the cross-section of the housing is rectangular, with the separator being cruciform in horizontal cross-section, and having four said lobes.

7. An electrochemical cell according to claim 1, wherein the cathode is located outside the separator, between the separator and the housing and surrounding the separator, with the anode located inside the interior of the separator, with the separator having an anode current collector projecting downwardly into its interior from its open upper end, to a position adjacent and spaced closely from its closed lower end.

8. A high temperature rechargeable electrochemical cell, comprising:

a housing in the form of a canister which is polygonal in cross-section so that it has a plurality of peripherally spaced corners;

a solid electrolyte separator which is a conductor of sodium ions, separating the interior of the housing into an anode compartment containing an anode and a cathode compartment containing a cathode, the separator being tubular or cup-shaped, having a closed end and an open end, and having a plurality of peripherally spaced radially outwardly projecting ribs or lobes corresponding in number to the corners of the housing, and the separator being concentrically located in the housing, with each lobe of the separator being peripherally aligned with, and projecting towards, one of said corners of the housing;

anchoring components anchoring the separator in position relative to the housing, with as many anchoring components as there are separator lobes being provided, each anchoring component comprising a first portion spanning a gap between the housing and the separator, between a pair of lobes of the separator, and a second portion protruding from the first portion, and engaging a surface of the lobe of the separator, with the first portions of the anchoring components being located between different pairs of the lobes, and the second portions thereof engaging different lobes of the separator, and with the second portion of one anchoring component overlapping the first portion of the anchoring component adjacent it;

sodium as active anode material in the anode compartment, with the cell having an operating temperature at which the sodium is molten; and active cathode material in the cathode compartment.

9. An electrochemical cell according to claim 8, wherein the anchoring components extend the full length of the separator, with the first and second portions of the anchoring components being such that the second portions of the anchoring components are biased into contact with the first portions of the adjacent anchoring components where said second portions overlap said first portions.

10. An electrochemical cell according to claim 8, wherein each anchoring component is formed from a metal sheet, with the first portion comprising a coil of the metal sheet extending substantially the full length of the separator, while the second component comprises a flap of the sheet protruding from the coil.

11. An electrochemical cell according to claim 10, wherein the coil comprises at least one full winding of the sheet, while the flap is arcuate shaped to accommodate the outer surface of the lobe.

12. An electrochemical cell according to claim 8, wherein the cross-section of the housing is rectangular, with the separator being cruciform in horizontal cross-section, and having four said lobes.

13. An electrochemical cell according to claim 8, wherein the cathode is located outside the separator, between the separator and the housing and surrounding the separator, with the anode located inside the interior of the separator, with the separator having an anode current collector projecting downwardly into its interior from its open upper end, to a position adjacent and spaced closely from its closed lower end.

14. A high temperature rechargeable electrochemical cell, comprising:

a housing in the form of a canister which is polygonal in cross-section so that it has a plurality of peripherally spaced corners;

a solid electrolyte separator which is a conductor of sodium ions, separating the interior of the housing into an anode compartment containing an anode and a cathode compartment containing a cathode, the separator being tubular or cup-shaped, having a closed end and an open end, and having a plurality of peripherally spaced radially outwardly projecting ribs or lobes corresponding in number to the corners of the housing, and the separator being concentrically located in the housing, with each lobe of the separator being peripherally aligned with, and projecting towards, one of said corners of the housing;

anchoring components anchoring the separator in position relative to the housing, with as many anchoring components as there are separator lobes being provided, each anchoring component comprising a first portion spanning a gap between the housing and the separator, between a pair of lobes of the separator, and a second portion protruding from the first portion, and engaging a surface of the lobe of the separator, with the first portions of the anchoring components being located between different pairs of the lobes, and the second portions thereof engaging different lobes of the separator, each anchoring component being formed from a metal sheet, with the first portion thereof comprising a coil of the metal sheet extending substantially the full length of the separator, and with the coil comprising at least one full winding of the sheet, while the second component comprises a flap of the sheet protruding from the coil and being arcuate-shaped to accommodate the outer surface of the lobe;

sodium as active anode material in the anode compartment, with the cell having an operating temperature at which the sodium is molten; and active cathode material in the cathode compartment.

15. An electrochemical cell according to claim 14, wherein the cross-section of the housing is rectangular, with the separator being cruciform in horizontal cross-section, and having four said lobes.

16. An electrochemical cell according to claim 14, wherein the cathode is located outside the separator, between the separator and the housing and surrounding the separator, with the anode located inside the interior of the separator, with the separator having an anode current collector projecting downwardly into its interior from its open upper end, to a position adjacent and spaced closely from its closed lower end.

* * * * *